United States Patent

Park

(10) Patent No.: US 12,424,643 B2
(45) Date of Patent: Sep. 23, 2025

(54) THERMAL MANAGEMENT SYSTEM FOR A FUEL CELL ELECTRIC VEHICLE AND A METHOD FOR CONTROLLING SAME

(71) Applicants: HYUNDAI MOTOR COMPANY, Seoul (KR); KIA CORPORATION, Seoul (KR)

(72) Inventor: Seok Hyeon Park, Hampyeong-eup (KR)

(73) Assignees: HYUNDAI MOTOR COMPANY, QR Seoul (KR); KIA CORPORATION, Seoul (KR)

( * ) Notice: Subject to any disclaimer, the term of this patent is extended or adjusted under 35 U.S.C. 154(b) by 570 days.

(21) Appl. No.: 17/974,119

(22) Filed: Oct. 26, 2022

(65) Prior Publication Data

US 2023/0420710 A1    Dec. 28, 2023

(30) Foreign Application Priority Data

Jun. 28, 2022  (KR) ........................ 10-2022-0079186

(51) Int. Cl.
*H01M 8/0432* (2016.01)
*B60L 58/40* (2019.01)
(Continued)

(52) U.S. Cl.
CPC ......... *H01M 8/04373* (2013.01); *B60L 58/40* (2019.02); *H01M 8/0494* (2013.01);
(Continued)

(58) Field of Classification Search
CPC ............. H01M 10/613; H01M 10/625; H01M 10/6568; H01M 16/006; H01M 2220/20;
(Continued)

(56) References Cited

U.S. PATENT DOCUMENTS 9,944,152 B2   4/2018  Kim et al.
10,322,617 B2  6/2019  Kohl et al.
(Continued)

FOREIGN PATENT DOCUMENTS

JP    2019079658 A    5/2019
KR    20140076049 A   6/2014
(Continued)

OTHER PUBLICATIONS

Office Action cited in Korean application No. 10-2020-0173313; Jul. 4, 2025; 16 pp.

*Primary Examiner* — Adam A Arciero
(74) *Attorney, Agent, or Firm* — Lempia Summerfield Katz LLC

(57) ABSTRACT

A thermal management control apparatus includes: a stack cooling line configured to cool a fuel cell stack of the fuel cell electric vehicle; a battery cooling line configured to cool a battery of the fuel cell electric vehicle; a heat exchanger configured to exchange heat between a stack coolant of the stack cooling line and a battery coolant of the battery cooling line; a valve configured to control an inflow of the stack coolant to the heat exchanger; and a control apparatus. The control apparatus is configured to diagnose whether a component of the valve or the battery cooling line has failed when the battery is overheated and to control a fuel cell output to cool the stack coolant and cool the battery by using a temperature of the stack coolant when a failure of the valve or a component failure of the battery cooling line occurs.

20 Claims, 12 Drawing Sheets

(51) Int. Cl.
    *H01M 8/04858*     (2016.01)
    *H01M 10/613*     (2014.01)
    *H01M 10/625*     (2014.01)
    *H01M 10/6568*     (2014.01)
    *H01M 16/00*     (2006.01)

(52) U.S. Cl.
    CPC ....... *H01M 10/613* (2015.04); *H01M 10/625* (2015.04); *H01M 10/6568* (2015.04); *H01M 16/006* (2013.01); *B60L 2240/545* (2013.01); *H01M 2220/20* (2013.01); *H01M 2250/20* (2013.01)

(58) Field of Classification Search
    CPC ................ H01M 2250/20; B60L 58/40; B60L 2240/545; B60L 2240/36; B60L 3/00; B60L 3/0092; B60L 58/26; B60L 58/33; B60L 1/003; F25B 25/005; B60Y 2306/05; B60Y 2306/15; B60Y 2400/102; B60Y 2400/112; Y02T 10/70; Y02T 90/40
See application file for complete search history.

(56) References Cited

U.S. PATENT DOCUMENTS

| | | | |
|---|---|---|---|
| 10,665,874 | B2 | 5/2020 | Min et al. |
| 10,714,799 | B2 | 7/2020 | Yamamura |
| 2013/0022888 | A1 | 1/2013 | Vollmer et al. |
| 2017/0106725 | A1 | 4/2017 | Kim et al. |
| 2018/0316026 | A1 | 11/2018 | Min et al. |
| 2019/0123406 | A1 | 4/2019 | Yamamura |

FOREIGN PATENT DOCUMENTS

| | | | | |
|---|---|---|---|---|
| KR | 20150028931 A | 3/2015 | | |
| KR | 101703604 B1 | 2/2017 | | |
| KR | 20180120290 A | 11/2018 | | |
| KR | 20220083903 A | 6/2022 | | |
| WO | WO-2005041333 A1 * | 5/2005 | ........ | H01M 8/04246 |
| WO | 2021170213 A1 | 9/2021 | | |
| WO | 2021204336 A1 | 10/2021 | | |

* cited by examiner

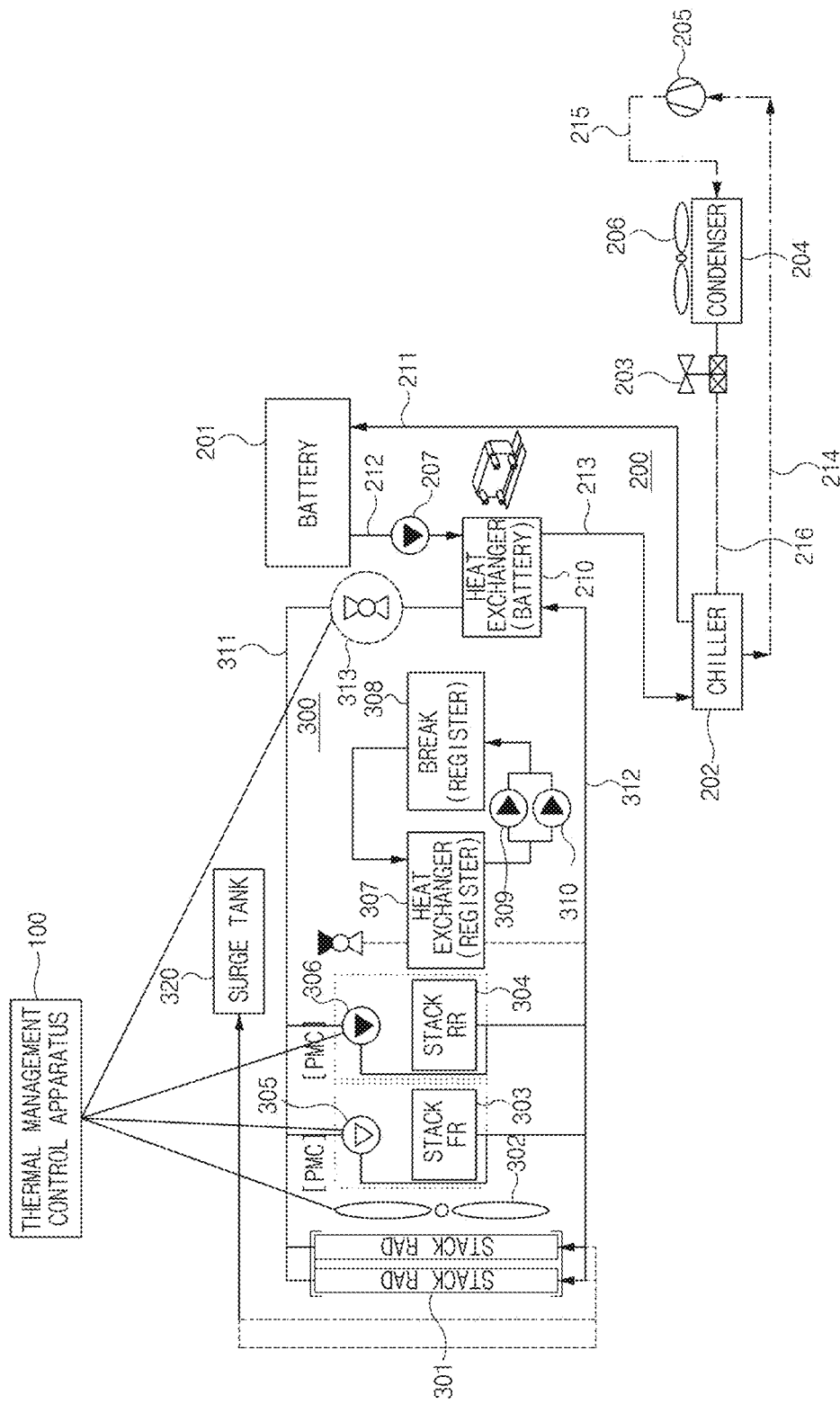
F I G. 1

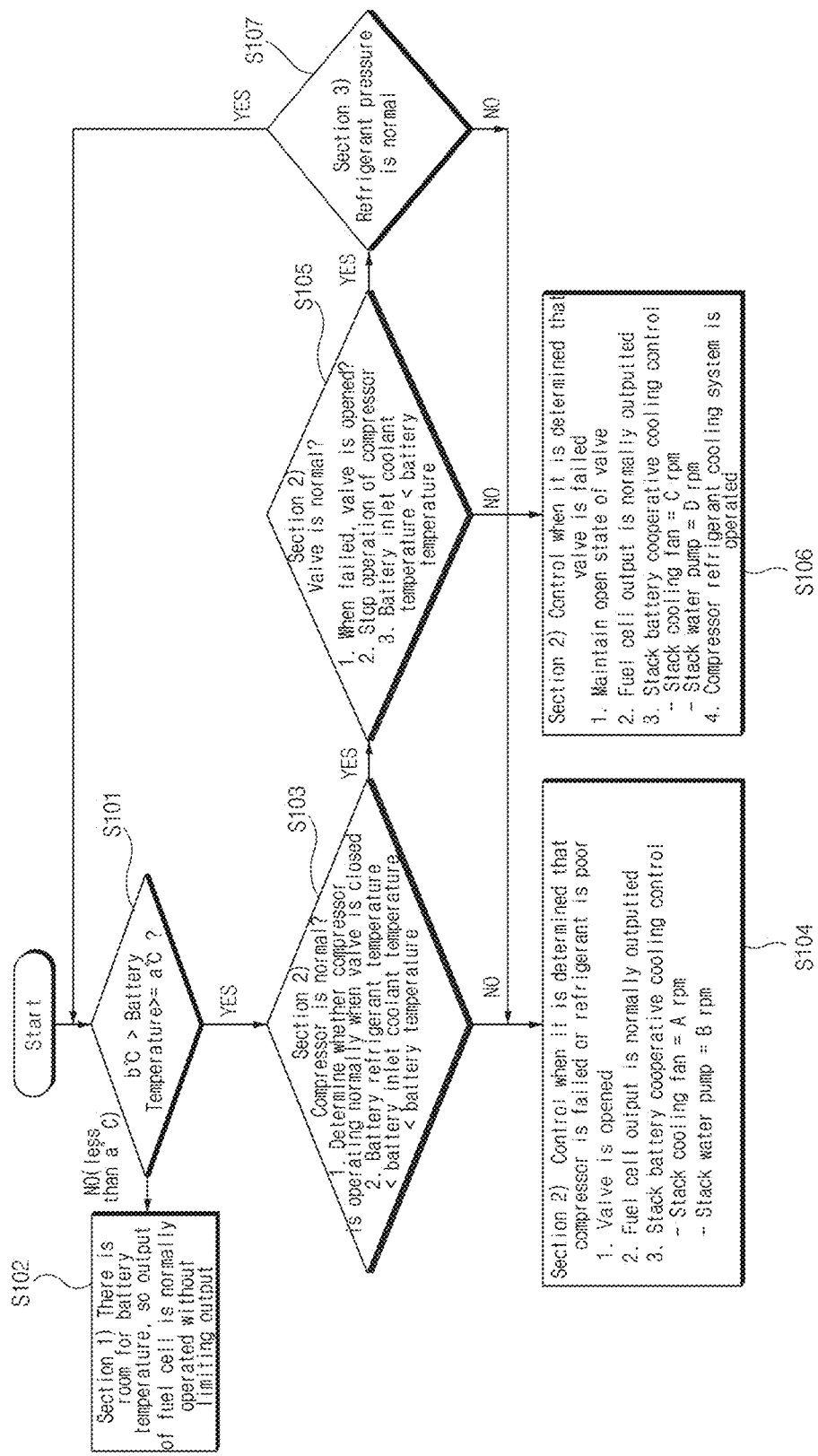
F I G. 9

THERMAL MANAGEMENT SYSTEM FOR A FUEL CELL ELECTRIC VEHICLE AND A METHOD FOR CONTROLLING SAME

CROSS-REFERENCE TO RELATED APPLICATION

This application claims priority to and the benefit of Korean Patent Application No, 10-2022-0079186, filed in the Korean Intellectual Property Office on Jun. 28, 2022, the entire contents of which are incorporated herein by reference.

BACKGROUND

(a) Field of the Disclosure

The present disclosure relates to a thermal management system for a fuel cell electric vehicle and a control method thereof, and more particularly, to a technique capable of solving a problem of battery overheating due to failure of electrical components of the thermal management system for a fuel cell electric vehicle.

(b) Description of the Related Art

For a commercial hydrogen vehicle, several cooling systems, such as fuel cells, batteries, power electric (PE) components, ATMs, and brake resistors, are configured in one vehicle.

Each cooling system characteristic (ion conductivity, driving conditions, and the like) and required target performance (temperature conditions and the like) are different, Thus, an integrated thermal management system applied with a heat exchanger is configured and applied and efforts are being made to develop technologies for optimizing performance, cost, weight, and energy efficiency thereof.

Particularly, the importance of fuel cell cooling has grown due to the mounting of high-power fuel cells. Thus, batteries, Pes, and resistors that generate relatively little heat require reduction in cooling components and optimization in layout.

A conventional thermal management system for cooling fuel cells and batteries attempts to solve battery overheating by limiting battery output voltage when the battery overheating occurs. For example, a battery overheats due to a failure of an internal electronic control component, so that a vehicle cannot be driven due to battery output limitations.

The above information disclosed in this Background section is only to enhance understanding of the background of the disclosure. Therefore, the Background section may contain information that does not form the prior art that is already known in this country to a person of ordinary skill in the art.

SUMMARY

An embodiment of the present disclosure has been made in an effort to provide a thermal management system for a fuel cell electric vehicle and a control method thereof. The system and method are capable of preventing a vehicle from being unable to be driven by solving or preventing battery overheating caused by a failure of an electronic component without limiting a battery output.

The technical objects of the present disclosure are not limited to the objects mentioned above. Other technical objects not mentioned herein may be dearly understood by those having ordinary skill in the art from the description and the claims.

An embodiment of the present disclosure provides a thermal management control apparatus including: a stack cooling line configured to cool a fuel cell stack of the fuel cell electric vehicle; a battery cooling line configured to cool a battery of the fuel cell electric vehicle; a heat exchanger configured to exchange heat between a stack coolant of the stack cooling line and a battery coolant of the battery cooling line; a valve configured to control an inflow of the stack coolant to the heat exchanger; and a control apparatus. The control apparatus is configured to diagnose whether a component of the valve or the battery cooling line has failed when the battery has overheated. The control apparatus is further configured to control a fuel cell output to cool the stack coolant and cool the battery by using a temperature of the stack coolant when a failure of the valve or a component failure of the battery cooling line occurs.

In an embodiment of the present disclosure, the control apparatus may be configured to determine whether the component of the battery cooling line has failed by determining whether a temperature of the battery cooling line is normal by driving the component of the battery cooling line after the valve is closed.

In an embodiment of the present disclosure, the control apparatus may be configured to drive the component of the battery cooling line in a closed state of the valve, and then to determine that the component of the battery cooling line is in a normal state when a battery coolant temperature is lower than a battery inlet coolant temperature, and the battery inlet coolant temperature is lower than a battery temperature.

In an embodiment of the present disclosure, the control apparatus may be configured to stop an operation of the component of the battery cooling line for a predetermined time in an open state of the valve. The control apparatus may be further configured to determine whether the valve has failed by determining whether a temperature of the battery cooling line is in a normal state.

In an embodiment of the present disclosure, the control apparatus may be configured to stop an operation of the component of the battery cooling line for a predetermined time in an open state of the valve, and then to determine that the valve is in a normal state when a battery inlet coolant temperature is lower than a battery temperature.

In an embodiment of the present disclosure, when all components of the valve and the battery cooling line are in a normal state, the control apparatus may be configured to determine an overpressure state or a low pressure state of a refrigerant pressure of the battery cooling line.

In an embodiment of the present disclosure, when a temperature of the battery is greater than or equal to a first reference value and is less than a second reference value that is greater than the first reference value, and when the component of the battery cooling line or the refrigerant pressure of the battery cooling line is in an overpressure or low pressure state, the control apparatus may be configured to open the valve to enable the stack coolant to flow into the heat exchanger. The control apparatus may also be configured to output the fuel cell output in a normal operating range and may be configured to control rotation speeds of a cooling fan and a water pump of the stack cooling line.

In an embodiment of the present disclosure, when the temperature of the battery is greater than or equal to the second reference value and is less than a third reference value that is greater than the second reference value, and when the component of the battery cooling line or the refrigerant pressure of the battery cooling line is in an overpressure or low pressure state, the control apparatus may be configured to open the valve to enable the stack coolant to flow into the heat exchanger. The control apparatus may also be configured to reduce the fuel cell output to within an allowable battery output to output the allowable battery output. The control apparatus may also be configured to control rotation speeds of a cooling fan and a water pump of the stack cooling line.

In an embodiment of the present disclosure, when the temperature of the battery is greater than or equal to a third reference value, and when the component of the battery cooling line or the refrigerant pressure of the battery cooling line is in an overpressure or low pressure state, the control apparatus may be configured to open the valve to enable the stack coolant to flow into the heat exchanger. The control apparatus may also be configured to reduce the fuel cell output to a predetermined minimum value to output the predetermined minimum value. The control apparatus may also be configured to control rotation speeds of a cooling fan and a water pump of the stack cooling line.

In an embodiment of the present disclosure, when the temperature of the battery is greater than or equal to the second reference value and is less than a third reference value that is greater than the second reference value, and when the valve has failed, the control apparatus may be configured to maintain the open state of the valve to enable the stack coolant to flow into the heat exchanger and to output the fuel cell output in a normal operating range. The control apparatus may also be configured to control rotation speeds of a cooling fan and a water pump of the stack cooling line and may be configured to cool the battery by using a refrigerant of the battery cooling line.

In an embodiment of the present disclosure, when the temperature of the battery is greater than or equal to the second reference value and is less than a third reference value that is greater than the second reference value, and when the valve has failed, the control apparatus may be configured to maintain the open state of the valve to enable the stack coolant to flow into the heat exchanger. The control apparatus may also be configured to reduce the fuel cell output to within an allowable battery output to output the allowable battery output. The control apparatus may also be configured to control rotation speeds of a cooling fan and a water pump of the stack cooling line and may be configured to cool the battery by using a refrigerant of the battery cooling line.

In an embodiment of the present disclosure, when the temperature of the battery is greater than or equal to a third reference value, and when the valve has failed, the control apparatus may be configured to maintain the open state of the valve to enable the stack coolant to flow into the heat exchanger. The control apparatus may also be configured to reduce the fuel cell output to a predetermined minimum value to output the predetermined minimum value. The control apparatus may also be configured to control rotation speeds of a cooling fan and a water pump of the stack cooling line and may be configured to cool the battery by using a refrigerant of the battery cooling line.

In an embodiment of the present disclosure, the component of the battery cooling line may include at least one of a compressor, a cooling fan, a condenser, an expander, or any combination thereof.

In an embodiment of the present disclosure, when a failure of the valve or a component failure of the battery cooling line occurs, without limiting a battery charging current or discharging current, the control apparatus may be configured to increase cooling performance of the stack cooling line by controlling an output of a fuel cell and driving of a cooling fan and a water pump of the stack cooling line for each battery temperature section.

An embodiment of the present disclosure provides a thermal management control method including: diagnosing, by a control apparatus, whether a component of a battery cooling line or a valve that controls an inflow of a stack coolant to a battery heat exchanger has failed when a temperature of a battery is excessive, i.e., the battery overheats; and cooling, by the control apparatus, the stack coolant by controlling a fuel cell output when a failure of the valve or a component failure of the battery cooling line occurs and the cooling of the battery by using the temperature of the stack coolant.

In an embodiment of the present disclosure, when a failure of the valve or a component failure of the battery cooling line occurs, without limiting a battery charging current or discharging current, the cooling of the battery by using the temperature of the stack coolant may include increasing cooling performance of the stack cooling line by controlling an output of a fuel cell and driving of a cooling fan and a water pump of the stack cooling line for each temperature section of the battery.

In an embodiment of the present disclosure, the diagnosing of whether the component of the battery cooling line or the valve has failed may include driving, by the control apparatus, the component of the battery cooling line in a closed state of the valve, and then determining that the component of the battery cooling line is in a normal state when a battery coolant temperature is lower than a battery inlet coolant temperature and the battery inlet coolant temperature is lower than a battery temperature.

In an embodiment of the present disclosure, the diagnosing of whether the component of the battery cooling line or the valve has failed may include stopping, by the control apparatus, an operation of the component of the battery cooling line for a predetermined time in an open state of the valve, and then determining whether the valve has failed by determining whether the temperature of the battery cooling line is in a normal state.

In an embodiment of the present disclosure, the thermal management control method may further include, when all components of the valve and the battery cooling line are in a normal state, determining an overpressure state or a low pressure state of a refrigerant pressure of the battery cooling line.

In an embodiment of the present disclosure, when a temperature of the battery is greater than or equal to a first reference value and is less than a second reference value that is greater than the first reference value, and when the component of the battery cooling line or the refrigerant pressure of the battery cooling line is in an overpressure or low pressure state, the thermal management control method may further include: opening, by the control apparatus, the valve to enable the stack coolant to flow into the heat exchanger; outputting, by the control apparatus, the fuel cell output in a normal operating range; and controlling, by the control apparatus, rotation speeds of a cooling fan and a water pump of the stack cooling line.

According to the present technique, it is possible to prevent a vehicle from being unable to be driven by solving or preventing battery overheating caused by a failure of an electronic component without limiting a battery output.

Furthermore, various effects that can be directly or indirectly identified through this document may be provided.

BRIEF DESCRIPTION OF THE DRAWINGS

FIG. 1 illustrates a schematic diagram of a vehicle system including a thermal management control apparatus according to an embodiment of the present disclosure.

FIGS. 9-11 each illustrate a flowchart showing an overheating protection control method for each battery temperature according to an embodiment of the present disclosure.

DETAILED DESCRIPTION OF THE EMBODIMENTS

Figure 2:
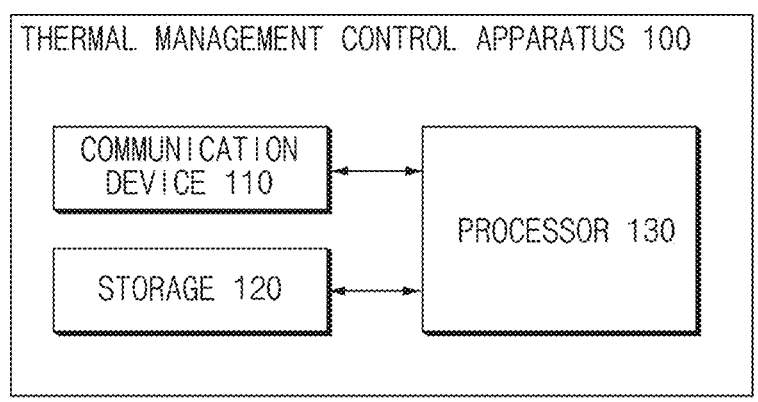
FIG. 2 illustrates a detailed schematic diagram of a thermal management control apparatus according to an embodiment of the present disclosure.

Hereinafter, some embodiments of the present disclosure are described in detail with reference to the accompanying drawings. It should be noted that, in adding reference numerals to constituent elements of each drawing, the same constituent elements have the same reference numerals, even though they are indicated on different drawings. Furthermore, in describing embodiments of the present disclosure, when it is determined that detailed descriptions of related well-known configurations or functions interfere with understanding of the embodiments of the present disclosure, the detailed descriptions thereof have been omitted.

In describing constituent elements according to an embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein, including technical scientific terms, have the same meanings as those which are generally understood by those having ordinary skill in the technical field to which an embodiment of the present disclosure pertains (those having ordinary skill in the art) unless they are differently defined. Terms defined in a generally used dictionary shall be construed to have meanings consistent with those in the context of the related art. Such terms should not be construed to have idealized or excessively formal meanings unless they are clearly defined in the present specification. When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to FIGS. 1-12.

FIG. 1 illustrates a schematic diagram of a vehicle system including a thermal management control apparatus according to an embodiment of the present disclosure. FIG. 2 illustrates a detailed schematic diagram of a thermal management control apparatus according to an embodiment of the present disclosure.

A fuel cell electric vehicle includes fuel cell stacks 303 and 304 that generate electricity for driving a motor (not illustrated). The fuel cell stacks 303 and 304 may each include an air electrode (not illustrated), an electrolyte membrane (not illustrated), and a fuel electrode (not illustrated). For normal operation of the fuel cell stacks 303 and 304, it is required to adjust a temperature of the fuel cell stacks 303 and 304 within a predetermined range. For this reason, cooling or heating of the fuel cell stacks 303 and 304 may be required. The fuel cell stacks 303 and 304 may be provided in the form of a power module complete (PMC) or PMC module. In the case of a fuel cell commercial vehicle, the fuel cell stacks 303 and 304 (PMC module) may be provided because of a demand for a high output. The fuel cell stacks 303 and 304 may be positioned in parallel with stack cooling lines 311 and 312 described below. The stack cooling lines 311 and 312 cool the fuel cell stacks of the fuel cell electric vehicle.

As illustrated in FIG. 1, the fuel cell electric vehicle may include a stack cooling circuit 300 for cooling the fuel cell stacks 303 and 304. The stack cooling circuit 300 may include stack cooling lines 311 and 312 each through which a stack coolant for cooling the fuel cell stacks 303 and 304 flows. The stack cooling circuit 300 is positioned on the stack cooling lines 311 and 312 and may include a stack radiator 301 for air cooling the stack coolant. The stack cooling circuit 300 may include stack water pumps 305 and 306 positioned in the stack cooling lines 311 and 312 to pressurize the stack coolant. Reference numeral 302 indicates a fan configured to help air cooling of the stack radiator 301. For reference, the fuel cell stacks 303 and 304 may be heated through the stack coolant depending on a temperature of the stack coolant.

The stack cooling circuit 300 may include a heat exchanger 307, a brake resistor 308, and water pumps 309 and 310 for pumping a coolant flowing into the brake resistor 308.

The heat exchanger 307 may exchange heat between the coolant of the stack cooling lines 311 and 312 and the coolant of the brake resistor 308.

The stack cooling circuit 300 may include a valve 313 capable of blocking a flow of the coolant of the stack cooling line 311 to the heat exchanger 210. In other words, the valve 313 may control inflow of the stack coolant to the heat exchanger 210.

The stack cooling circuit 300 may include a surge tank 320, which is a component of an intake device.

The fuel cell electric vehicle includes a battery 201 (e.g., a high voltage battery) that stores electricity generated in the fuel cell stacks 303 and 304 or electricity generated during regenerative braking. For normal operation of the battery 201, it is required to adjust a temperature of the battery 201 within a predetermined range. As a result, cooling or heating of the battery 201 may be required. In the case of a fuel cell commercial vehicle, a plurality of batteries 201 may be provided because of a demand for a high output. The batteries 201 may be positioned in parallel with battery cooling lines 211, 212, and 213, described below. The battery cooling lines 211, 212, and 213 cool a battery of the fuel cell electric vehicle.

The fuel cell electric vehicle may include a battery cooling circuit 200 for cooling the batteries 201 as illustrated in FIG. 1. The battery cooling circuit 200 may include battery cooling lines 211, 212, and 213 through which a battery coolant for cooling the battery 201 flows. The battery cooling circuit 200 may include a cooling line 141 through which a refrigerant for cooling the battery coolant flows. For reference, depending on a temperature of the battery coolant, the batteries 201 may be heated through the battery coolant.

The battery cooling circuit 200 may include a chiller 202 positioned in the battery cooling lines 211, 212, and 213 to air-cool the battery coolant. The battery cooling circuit 200 may include a battery water pump 207 positioned in the battery cooling line 212 to pressurize the battery coolant.

The battery cooling circuit 200 includes a compressor 205, a condenser 204, an expander 203 (e.g., an expansion valve), and a chiller 202 for compressing, condensing, expanding, and evaporating the refrigerant in the cooling lines 214, 215, and 216. In addition, a cooling fan 206 for cooling the condenser 204 may be further included. These components may be sequentially positioned in the cooling lines 214, 215, and 216 to implement a refrigeration cycle. The refrigerant evaporated in the chiller 202 may cool the battery coolant in the battery cooling lines 211, 212, and 213. The battery coolant cooled by the chiller 202 may be supplied to the batteries 201 to cool the batteries 201. The battery coolant may be cooled by the chiller 202.

In addition, the battery cooling circuit 200 may include a heat exchanger 210 for heat exchange between the stack cooling circuit 300 and the battery cooling circuit 200.

According to the present embodiment, the thermal management system for a fuel cell electric vehicle may include the stack cooling lines 311 and 312 and battery cooling lines 211, 212, and 213 as described above.

The thermal management control apparatus 100 may perform a control strategy to protect the battery from overheating when the battery temperature rises due to malfunctions of the chiller 202 the compressor 205, the cooling fan 206, and the valve 313.

The thermal management control apparatus 100 may diagnose whether parts of the valve 313 or the battery cooling circuit 200 fail when the battery 201 is overheated. The thermal management control apparatus 100 may also control fuel cell output to cool the stack coolant and cool the battery 201 using the temperature of the stack coolant when such a failure of the valve 313 or such a component failure of the battery cooling circuit 200 occurs. Components of the battery cooling circuit 200 may include at least one of the compressor 205, the cooling fan 206, the condenser 204, the expander 203, or any combination thereof.

The thermal management control apparatus 100 may include a vehicle control unit (VCU) and a fuel cell control unit (FCU). The VCU may request an FCU output value based on battery temperature information, battery output limit information, and the like to request cooperative cooling control and perform control of the valve 313 and the cooling fan 302. In addition, the FCU may control the water pumps 305 and 306 inside a fuel cell and may control a valve 313 mounted at front ends of the water pumps 305 and 306, although not illustrated in FIG. 1. In other words, the thermal management control apparatus 100 may control the cooling fan 302, the valve 313, the water pumps 305 and 306, and the like to increase performance of the stack cooling circuit. In other words, air cooling performance of the radiator may be increased by controlling rotation of the cooling fan 302. Additionally, a flow rate of the coolant in the stack cooling circuit may be quickly controlled by controlling the water pumps 305 and 306 to further increase air cooling performance. Accordingly, the battery coolant may be effectively cooled by lowering a temperature of the coolant of the stack cooling circuit and providing it to the heat exchanger 210.

Referring to FIG. 2, the thermal management control apparatus 100 may include a communication device 110, a storage 120, and a processor 130.

The communication device 110 is a hardware device implemented with various electronic circuits to transmit and receive signals. The communication device 110 may also transmit and receive information to and from internal components of the thermal management system and devices in the vehicle based on in-vehicle network communication technology. As an example, the in-vehicle network communication techniques may include controller area network (CAN) communication, local interconnect network (LIN) communication, flex-ray communication, and the like.

As an example, the communication device 110 may transmit a control signal for controlling the water pumps 305 and 306, the valve 313, the cooling fan 302, or the like.

The storage 120 may store data and/or algorithms required for the processor 130 to operate, and the like.

As an example, the storage 120 may store logic for overheating protection for each battery temperature section and a sensing result received from each sensor (not illustrated). For example, the sensing result may include a battery coolant temperature, a battery inlet coolant temperature, a battery temperature, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, and the processor 130 may electrically control each component. In addition, the processor 130 may be an electrical circuit that executes software commands, thereby performing various data processing and calculations described below.

The processor 130 may process signals transferred between constituent elements of the thermal management control apparatus 100. The processor 130 may be implemented in the form of hardware, software, or a combination of hardware and software. The processor 130 may be implemented as a microprocessor, but the present disclosure is not limited thereto, and may be, e.g., an electronic control unit (ECU), a micro controller unit (MCU), or other sub-controllers mounted in the vehicle.

The processor 130 may diagnose whether parts of the valve 313 or the battery cooling circuit 200 fail when the battery 201 overheats. In addition, the processor 130 may control fuel cell output to cool the stack coolant and cool the battery 201 using the temperature of the stack coolant when such a failure of the valve 313 or such a component failure of the battery cooling circuit 200 occurs.

After the valve 313 is closed, the processor 130 may determine whether a component of a battery cooling line (battery cooling circuit 200) has failed by determining whether a temperature of the battery cooling line is normal by driving the component of the battery cooling line.

The processor 130 may drive the component (e.g., a compressor, a condenser, a fan, and the like) of the battery cooling line in a closed state of the valve 313. Further, the processor 130 then may determine that the component of the battery cooling line is in a normal state when a battery coolant temperature is lower than a battery inlet coolant temperature and that the battery inlet coolant temperature is lower than a battery temperature.

The processor 130 may stop an operation of the component of the battery cooling line for a predetermined time in an open state of the valve 313, and then may determine whether the valve 313 has failed by determining whether the temperature of the battery cooling line is in a normal state.

The processor 130 may stop the operation of the component of the battery cooling line for the predetermined time in the open state of the valve 313. Then, when the battery inlet coolant temperature is lower than the battery temperature, the processor 130 may determine that the valve is in a normal state.

When all components of the valve and the battery cooling line are in a normal state, the processor 130 may determine an overpressure or a low pressure state of a refrigerant pressure of the battery cooling line.

When the temperature of the battery 201 is above a first reference value (e.g., a ° C.), is less than a second reference value (e.g., b ° C.) that is greater than the first reference value, and when a refrigerant pressure of the battery cooling line or the component of the battery cooling line is in an overpressure state or a low pressure state, the processor 130 may open the valve 313 to enable the stack coolant to flow into the heat exchanger. The processor 130 may further output a fuel cell output in a normal operating range but may control rotation speeds of the cooling fan 302 and the water pumps 305 and 306 of the stack cooling line.

When the temperature of the battery 201 is greater than or equal to the second reference value and is less than a third reference value (e.g., c ° C.) that is greater than the second reference value, and when the refrigerant pressure of the battery cooling line or the component of the battery cooling line is in an overpressure state or a low pressure state, the processor 130 may open the valve 313 to enable the stack coolant to flow into the heat exchanger. Additionally, the processor 130 may reduce the fuel cell output to within an allowable battery output to output the allowable battery output and may control rotation speeds of the cooling fan 302 and the water pumps 305 and 306 of the stack cooling line.

When the temperature of the battery 201 is greater than or equal to the third reference value, and when the refrigerant pressure of the battery cooling line or the component of the battery cooling line is in an overpressure state or a low pressure state, the processor 130 may open the valve 313 to enable the stack coolant to flow into the heat exchanger 210. Additionally, the processor 130 may reduce the fuel cell output to a predetermined minimum value to output the predetermined minimum value and may control rotation speeds of the cooling fan 302 and the water pumps 305 and 306 of the stack cooling line.

When the temperature of the battery 201 is greater than the second reference value and less than the third reference value that is greater than the second reference value, and when the valve 313 is in a fault state, i.e., has failed, the processor 130 maintains an open state of the valve 313 so that the stack coolant flows into the heat exchanger. Additionally, the processor 130 may output the fuel cell output to a normal operating range but may control rotation speeds of the cooling fan 302 and the water pumps 305 and 306 of the stack cooling line. Further, the processor 130 may cool the battery using the refrigerant in the battery cooling line.

When the temperature of the battery 201 is greater than the second reference value and less than the third reference value that is greater than the second reference value, and when the valve 313 is in a fault state, the processor 130 maintains an open state of the valve 313 so that the stack coolant flows into the heat exchanger 210. In addition, the processor 130 may also reduce the fuel cell output to within an allowable battery output to output the allowable battery output, may control rotation speeds of the cooling fan 302 and the water pumps 305 and 306 of the stack cooling line, and may cool the battery 201 using the refrigerant in the battery cooling line.

When the temperature of the battery 201 is greater than the third reference value and when the valve 313 is in a fault state, the processor 130 maintains the open state of the valve 313 so that the stack coolant flows into the heat exchanger. The processor 130 may also reduce the fuel cell output to a predetermined minimum value to output the predetermined minimum value, may control rotation speeds of the cooling fan 302 and the water pumps 305 and 306 of the stack cooling line, and may cool the battery 201 using the refrigerant in the battery cooling line.

When a failure of the valve 313 or a component failure of the battery cooling line occurs, the processor 130 may increase cooling performance of the stack cooling line by controlling an output of the fuel cell and operation of the cooling fan 302 and the water pumps 305 and 306 of the stack cooling line for each battery temperature section without limiting a battery charging current or discharging current.

During vehicle driving, the thermal management control apparatus 100 shuts off the valve 313 in a condition above a battery level of z ° C. and cools the battery 201 using the chiller 202. In this case, z may be predetermined as an experimental value. However, when the open state of the valve 313 continues due to a failure of the valve 313, poor communication, poor control, and the like, the stack coolant at a level of 60 to 80° C. increases the temperature of the battery coolant through the heat exchanger 210, so that the temperature of the battery 201 continues to rise to reach a level of b~c ° C. Accordingly, the thermal management control apparatus 100 prevents overheating of the battery by limiting current charging and discharging. However, since heavy commercial vehicles cannot be driven at all due to a large current limit for battery overheating protection, the thermal management control apparatus 100 may use the coolant of the stack cooling circuit 300 to cool the coolant of the battery 201 to minimize the current limit, thereby preventing the vehicle from being unable to be driven.

Figure 3:
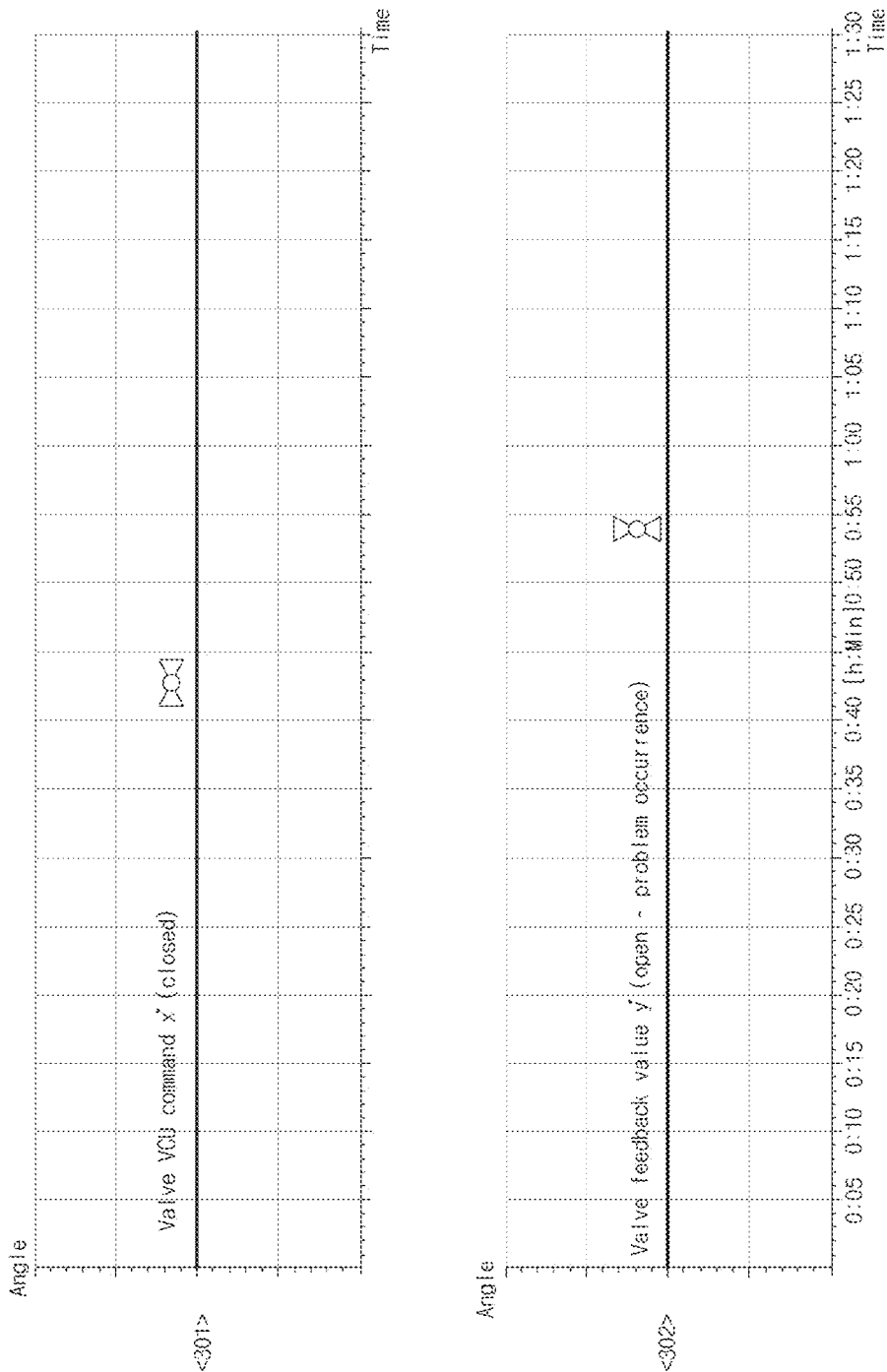
FIG. 3 illustrates a view for describing a closed state and an open state of a battery valve according to an embodiment of the present disclosure.

FIG. 3 illustrates a view for describing a closed state and an open state of a battery valve 313 according to an embodiment of the present disclosure.

Referring to 301 of FIG. 3, when the valve 313 is rotated by x°, it can be determined to be closed. Further, as shown in 302, when the valve 313 is rotated by y°, it can be determined to be open. In this case, x and y may be predetermined as an experimental value.

Figure 4:
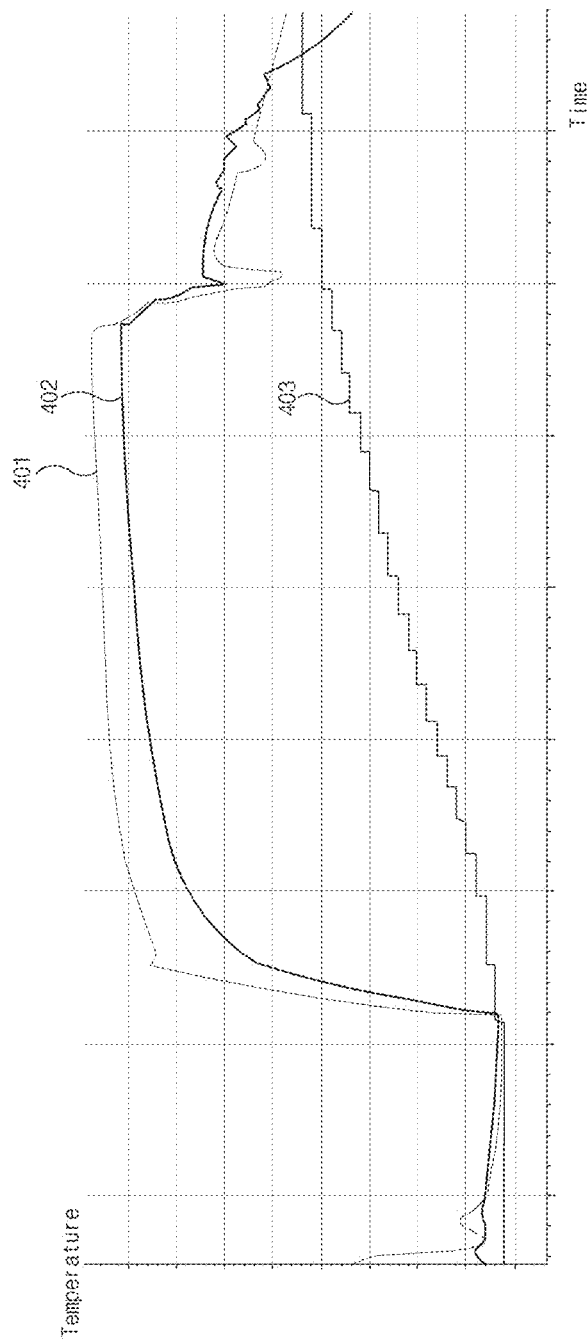
FIG. 4 illustrates a view for describing an example of an increase in a battery temperature due to a valve failure according to an embodiment of the present disclosure.

FIG. 4 illustrates a view for describing an example of an increase in a battery temperature due to a valve failure according to an embodiment of the present disclosure. FIG.

5 illustrates a view describing an example of the occurrence of battery charge or discharge limit limitation due to overheating according to an embodiment of the present disclosure.

Referring to FIG. 4, in a state in which temperatures of an inlet stack coolant 401 of the heat exchanger 210 and an outlet stack coolant 402 of the heat exchanger 210 are increased, the failure of the valve 313 causes the temperature of the battery coolant passing through the heat exchanger 210 to increase while the stack coolant passes through the heat exchanger 210, As a result, a temperature 403 of the battery 201 continues to rise.

Figure 5:
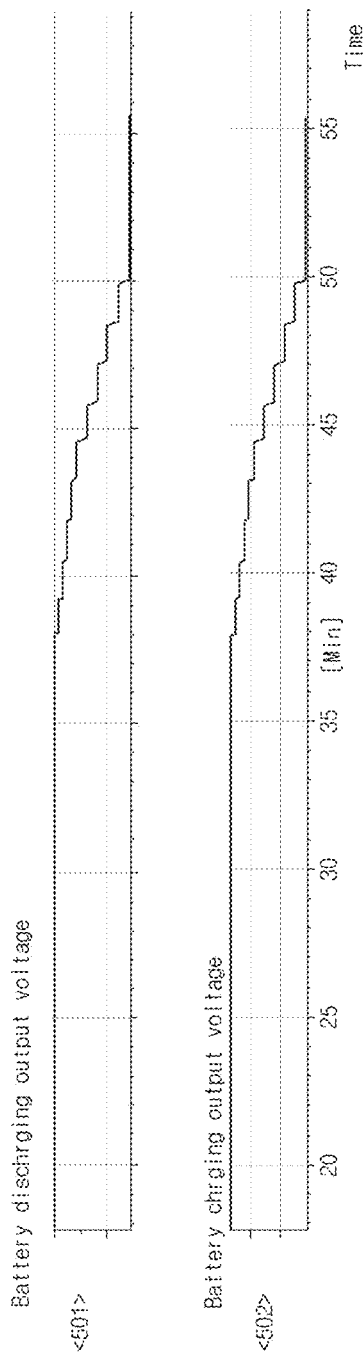
FIG. 5 illustrates a view for describing an example of an occurrence of battery charge or discharge limit threshold due to overheating according to an embodiment of the present disclosure.

In this case, as the temperature of the battery 201 increases, a battery discharge limit 501 and a battery charge limit 502 are performed as illustrated in FIG. 5 in order to prevent the battery 201 from being overheated. As such, it may be difficult to drive a heavy vehicle due to a limit of a battery charging and discharging current amount.

Figure 6:
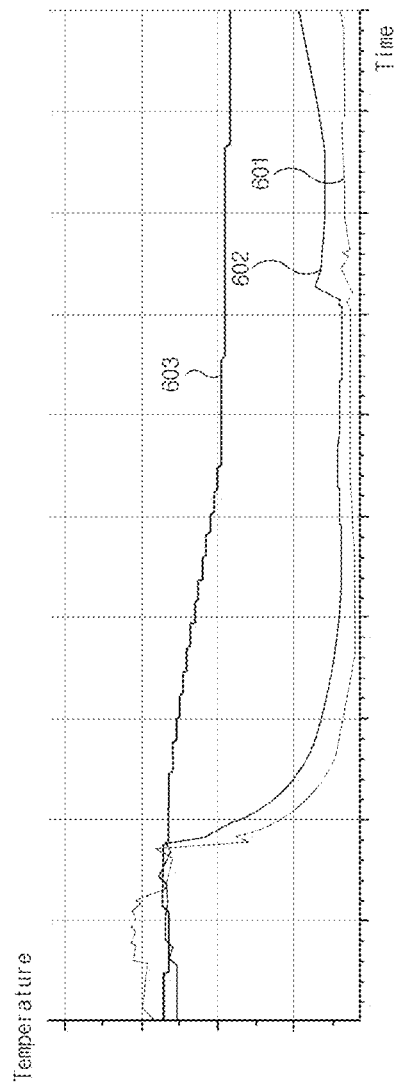
FIG. 6 illustrates a view for describing an example of lowering a battery temperature using a stack cooling line when the battery temperature rises due to a valve failure according to an embodiment of the present disclosure.
Figure 7:
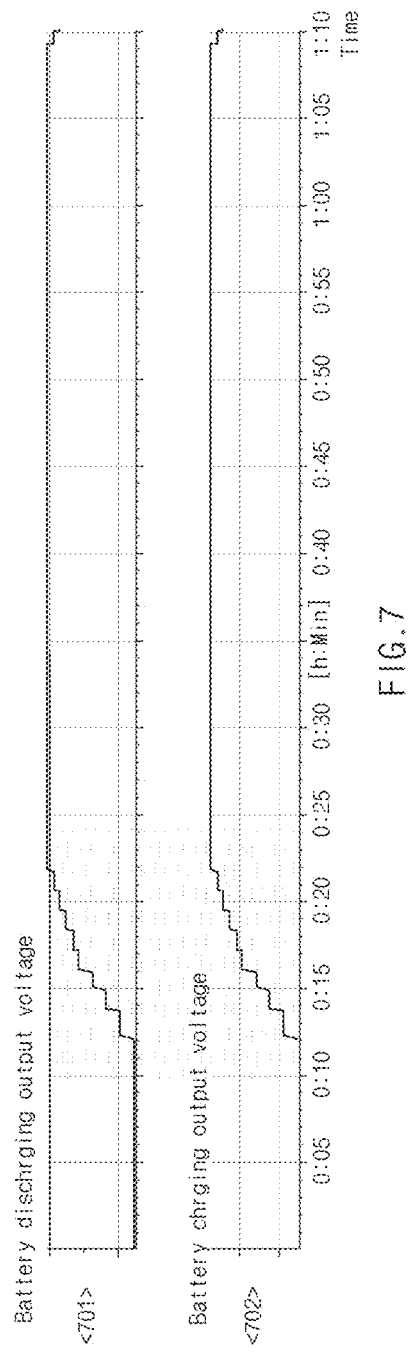
FIG. 7 illustrates a view for describing an example of releasing a battery charge or discharge limit threshold depending on lowering a battery temperature according to an embodiment of the present disclosure.

Accordingly, it is not necessary to limit the battery charging and discharging current amount as illustrated in FIG. 7 by cooling the temperature of the battery 201 using the stack cooling line as illustrated in FIG. 6 below.

FIG. 6 illustrates a view for describing an example of cooling a battery temperature using a stack cooling line when the battery temperature rises due to a valve failure according to an embodiment of the present disclosure. FIG. illustrates a view for describing an example of releasing a battery charge or discharge limit limitation, i.e., threshold, depending on lowering a battery temperature according to an embodiment of the present disclosure.

Referring to FIG. 6, the thermal management control apparatus 100 lowers the temperature of the battery coolant passing through the heat exchanger 210. The control apparatus 100 does so while the stack coolant, having a lowered temperature, passes through the heat exchanger 210 in a state in which the valve 313 is opened due to the occurrence of a failure of the valve 313, by reducing temperatures of an inlet stack coolant 601 of the heat exchanger 210 and an outlet stack coolant 602 of the heat exchanger 210. The temperatures of the inlet stack coolant 601 and the outlet stack coolant 602 of the heat exchanger 210 are reduced through cooling control such as fuel cell output control, a stack cooling fan, and a stack water pump. Accordingly, a temperature 603 of the battery 201 is decreased.

Referring to FIG. 7, since the temperature of the battery 201 is lowered, it is possible to drive a heavy commercial vehicle by releasing the battery charging and discharging output limit.

Figure 8:
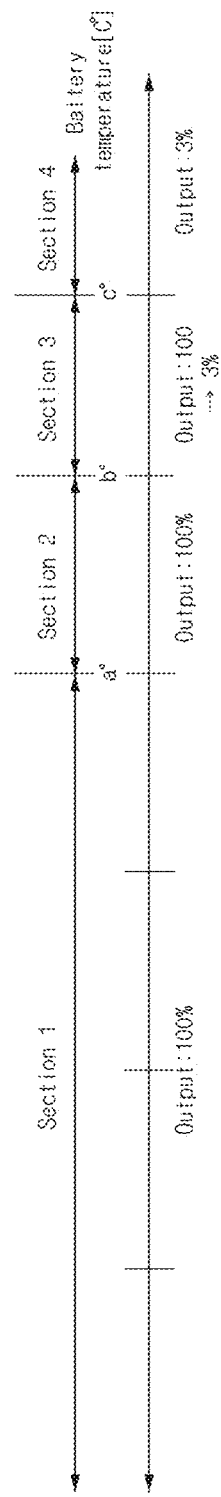
FIG. 8 illustrates a view for describing a fuel cell output for each battery temperature according to an embodiment of the present disclosure.
Figure 10:
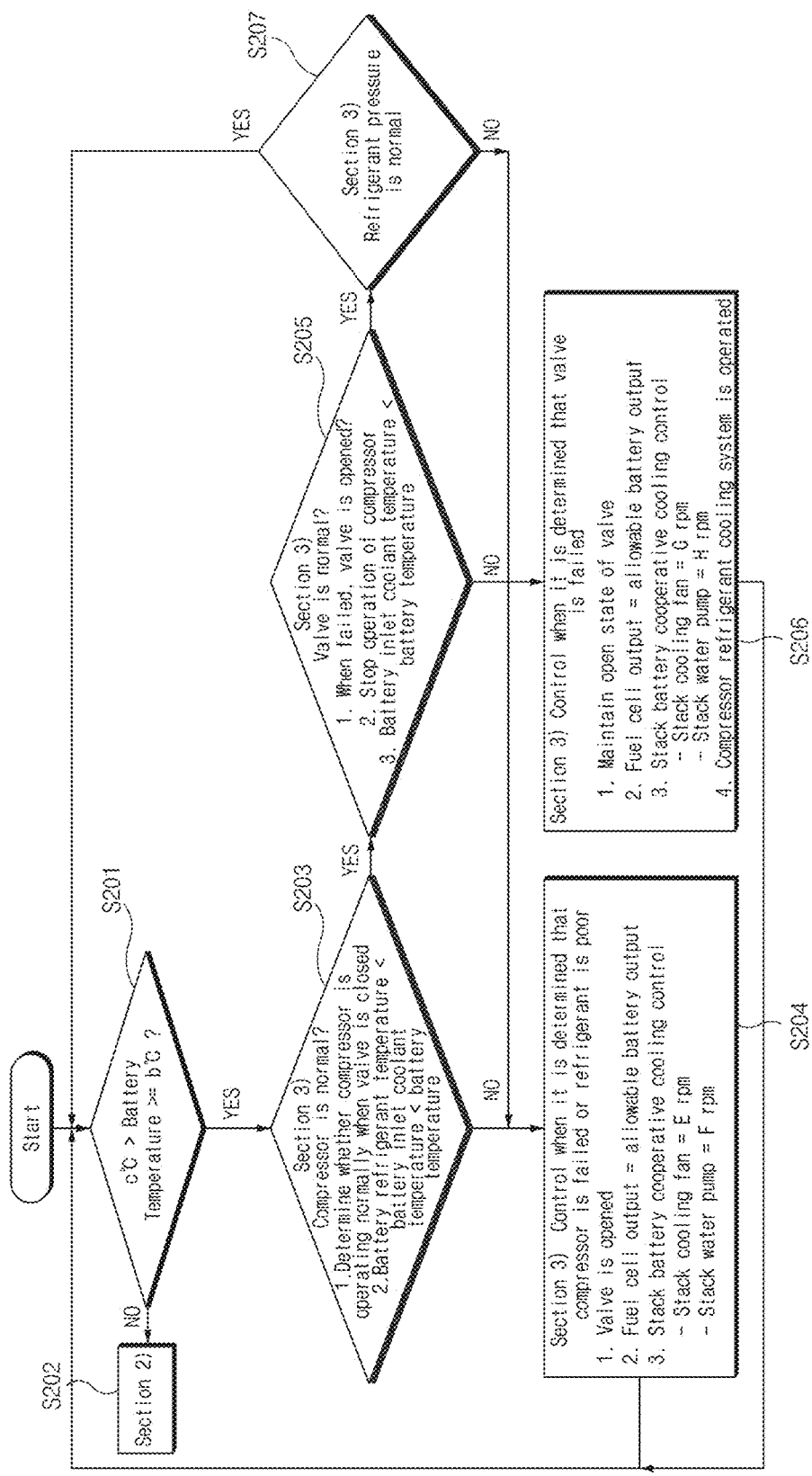
Figure 11:
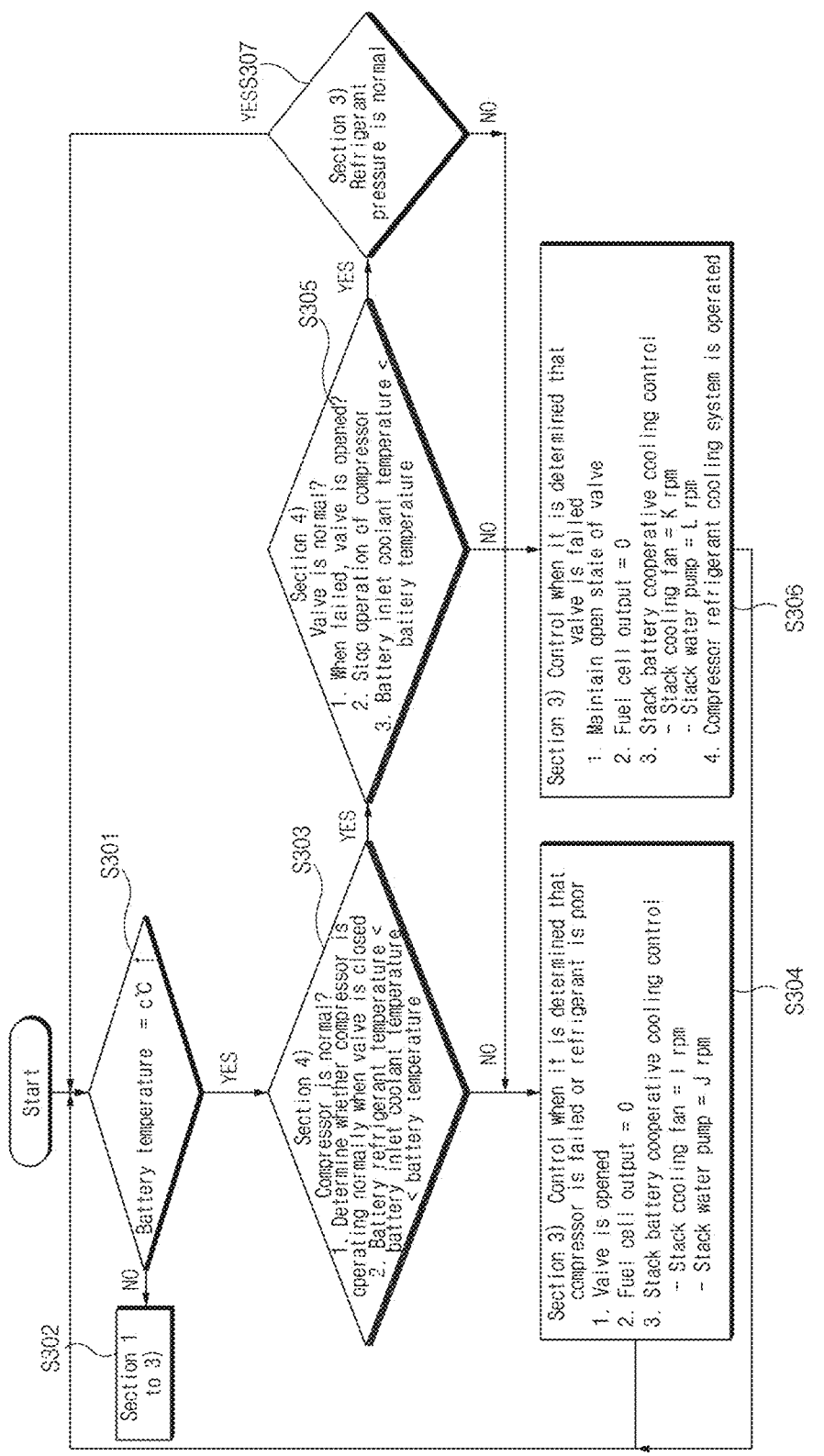

Hereinafter, an over-temperature protection control method for each battery temperature according to an embodiment of the present disclosure is described in detail with reference to FIGS. 8-11. FIG. 8 illustrates a view describing a fuel cell output for each battery temperature according to an embodiment of the present disclosure. FIGS. 9-11 each illustrate a flowchart showing an overheating protection control method for each battery temperature according to an embodiment of the present disclosure.

First, referring to FIG. 8, a temperature section of the battery 201 may be divided into Section 1, Section 2, Section 3, and Section 4, depending on the temperature of the battery 201. In other words, when the temperature of the battery 201 is less than the first reference temperature (e.g., a ° C.), it corresponds to Section 1, When the temperature of the battery 201 is greater than or equal to the first reference temperature (e.g., a ° C.) and less than the second reference temperature (e.g., b ° C.), it corresponds to Section 2. When the temperature of the battery 201 is greater than or equal to the second reference temperature (e.g., b ° C.) and less than the third reference temperature (e.g., c ° C.), it corresponds to Section 3, When the temperature of the battery 201 is equal to or higher than the third reference temperature (e.g., c ° C.), it corresponds to Section 4. In this case, the first reference temperature (a ° C.), the second reference temperature (b ° C.), and the third reference temperature (c ° C.) may be determined in advance by experiment values.

The thermal management control apparatus 100 may lower a stack coolant temperature by varying a fuel cell output for each section. For example, 100% of the fuel cell output may be output in Section 1 and Section 2, and only 3% in Section 3 and 3% in Section 4 may be controlled.

In other words, in Section 1 and Section 2, it is driven without limiting the fuel cell output, and in Sections 3 and 4, the fuel cell output may be limited to protect the battery from overheating. In Section 3, a fuel cell output demand may be set depending on a battery limit value (allowable battery value), and in Section 4, the fuel cell may be disabled until the battery is cooled.

Hereinafter, it is assumed that the thermal management control apparatus 100 of FIG. 1 performs the processes of FIGS. 9-11. In addition, in the description of FIGS. 9-11, operations described as being performed by the device may be understood as being controlled by the processor 130 of the thermal management control apparatus 100.

Referring to FIG. 9, the thermal management control apparatus 100 determines whether the battery temperature is greater than or equal to the first reference temperature (e.g., a ° C.) and less than the second reference temperature (e.g., b ° C.) (S101). In this case, the thermal management control apparatus 100 may receive battery temperature information from a battery management system (not illustrated) or a battery temperature sensor (not illustrated).

In the thermal management control apparatus 100, when a battery temperature is less than the first reference temperature (e.g., a ° C.), it corresponds to Section 1. Since there is room for the battery temperature, an output of the fuel cell is normally operated without limiting the output of the fuel cell (S102).

When the battery temperature is above the first reference temperature (e.g., a ° C.) and less than the second reference temperature (e.g., b ° C.), the thermal management control apparatus 100 determines whether the compressor 205 is normal (S103). In this case, the thermal management control apparatus 100 closes the valve 313 so that the stack coolant does not flow into the heat exchanger 210, and then may check the battery temperature to determine whether the compressor 205 is operating normally. In other words, when the battery temperature is normal while the valve 313 is closed, it may be determined that the compressor 205 operates normally. Further, when a battery refrigerant temperature is lower than a battery inlet coolant temperature and the battery inlet coolant temperature is lower than the battery temperature, the thermal management control apparatus 100 may determine that the compressor 205 is operating normally. In addition, when the battery refrigerant temperature is higher than the battery inlet coolant temperature, the battery inlet coolant temperature is higher than the battery temperature or the battery refrigerant temperature is higher than the battery temperature, the thermal management control apparatus 100 may determine that the compressor 205 has failed.

In this case, the battery refrigerant temperature indicates the temperature of the chiller 202 of FIG. 1, the battery inlet coolant temperature indicates the temperature of the coolant line 211 in FIG. 1, and the battery temperature indicates the temperature of the battery 201, In other words, when the compressor 205 operates normally, because the battery refrigerant temperature of the chiller 202 closest to the compressor 205 is the lowest, the battery inlet coolant temperature closest to the compressor 205 is low, and the temperature of the battery 201 at which the coolant temperature finally reaches becomes the highest. As such, as the distance from the compressor 205 increases, the thermal management control apparatus 100 determines whether the compressor 205 has failed by using a sequential ease in the coolant temperature.

In this case, the thermal management control apparatus 100 may determine a failure of the cooling fan 206 instead of the failure of the compressor 205. In other words, it is possible to determine a failure of components (the compressor 205, the condenser 204, the expander 203, the cooling fan 206, and the like) connected to the cooling lines 214, 215, and 216, including the chiller 202.

The thermal management control apparatus 100 may perform a control strategy for battery overheating protection when the compressor 205 is in a fault state (S104). In other words, the thermal management control apparatus 100 may open the valve 313 to enable the stack coolant to flow into the heat exchanger 210 to lower the battery coolant temperature. In addition, the thermal management control apparatus 100 may normally output a fuel cell output for battery overheating protection. In addition, the thermal management control apparatus 100 performs stack battery cooperative cooling control to protect the battery from overheating. In other words, the thermal management control apparatus 100 may rotate the cooling fan 302 of the stack cooling circuit 300 at A revolutions per minute (rpm) to help air-cooling of the radiator 301. The thermal management control apparatus 100 may also rotate the water pumps 305 and 306 at B rpm to increase a water pumping force so that the coolant in the stack cooling circuit 300 flows well. As such, when a failure of the compressor 205 occurs, when the temperature of the battery 201 rises above a ° C., thermal management control apparatus 100 may lower the stack coolant temperature by increasing a rotational force of the cooling fan 302 and increasing rotational forces of the water pumps 305 and 306 while normally outputting the fuel cell output. In this case, A and B may be determined in advance as optimal values by experimental values.

When the compressor 205 is in a normal state, not in a failure state, the thermal management control apparatus 100 determines whether the valve 313 has failed or is normal (3105).

The thermal management control apparatus 100 determines whether the valve 313 is in an open state due to a failure. In other words, since the valve 313 is closed during normal operation and opened when a failure occurs, when the valve 313 is in the open state, it may be determined as the failure state.

In addition, the thermal management control apparatus 100 may stop an operation of the compressor 205 for a predetermined time in order to determine whether the valve 313 has failed. In other words, the thermal management control apparatus 100 may determine whether the valve 313 has failed by checking the battery inlet coolant temperature and the battery temperature while the compressor 205 is stopped. In other words, the thermal management control apparatus 100 cools the temperature of the battery 201 only with the stack coolant temperature by the valve 313 when the operation of the compressor 205 is stopped. Thus, the thermal management control apparatus 100 checks the battery inlet coolant temperature and the battery temperature to determine whether the battery is being cooled properly. In other words, when the battery inlet coolant temperature is lower than the battery temperature, the thermal management control apparatus 100 may determine that the valve 313 is normally operated to properly cool the battery 201. Conversely, when the battery inlet coolant temperature is higher than the battery temperature while the compressor 205 is stopped, the thermal management control apparatus 100 may determine that the cooling of the battery 201 is not properly performed because the stack coolant temperature affects the coolant temperature of the battery 201 due to the failure of the valve 313.

When it is determined that the failure of the valve 313 occurs, the thermal management control apparatus 100 performs a control strategy for overheating protection (S106).

In other words, the thermal management control apparatus 100 maintains the open state of the valve 313 and maintains the fuel cell output as a normal output. In addition, the thermal management control apparatus 100 performs cooperative cooling control between the stack cooling circuit 300 and the battery cooling circuit 200. In other words, the thermal management control apparatus 100 may rotate the cooling fan 302 of the stack cooling circuit 300 at C rpm to help air-cooling of the radiator 301 and may rotate the water pumps 305 and 306 at Q rpm to increase a water pumping force so that the coolant in the stack cooling circuit 300 flows well. As such, when a failure of the valve 313 occurs, when the temperature of the battery 201 rises above a ° C., thermal management control apparatus 100 may lower the battery coolant temperature by increasing a rotational force of the cooling fan 302 and increasing rotational forces of the water pumps 305 and 306 while normally outputting the fuel cell output, thereby lowering the stack coolant temperature. In this case, C and D may be determined in advance as optimal values by experimental values, and may be the same as or different from A and B. In addition, the thermal management control apparatus 100 may use the compressor 205 to cool the battery 201.

When it is determined that the valve 313 is normal in step S105, the thermal management control apparatus 100 may determine whether a refrigerant pressure of the chiller 202 is normal (S107). In other words, the thermal management control apparatus 100 may determine whether the refrigerant pressure is greater than or less than a reference pressure to determine whether the pressure is overpressure or low pressure, thereby determining that the refrigerant is not in a normal state when it is overpressure or low pressure. In this case, the reference pressure may be predetermined as an experimental value.

When the refrigerant pressure is in an overpressure or low pressure state, the thermal management control apparatus 100 may perform a control strategy for overheating protection, as in step S104.

When the refrigerant pressure is normal, i.e., when the refrigerant pressure of the compressor 205, the valve 313, and the chiller 202 are all normal, the thermal management control apparatus 100 returns to step S101 to check the temperature of the battery 201 again.

Referring to FIG. 10, the thermal management control apparatus 100 determines whether the battery temperature is greater than or equal to the second reference temperature (e.g., b ° C.) and less than the third reference temperature (e.g., c ° C.) (S201).

When the battery temperature is less than the second reference temperature (e.g., b ° C.), it corresponds to Section 2. The thermal management control apparatus 100 performs the above-described process of FIG. 9 (S202).

When the battery temperature is above the second reference temperature (e.g., b ° C.) and less than the third reference temperature (e.g., c ° C.), the thermal management control apparatus 100 determines whether the compressor 205 is normal (S103). In this case, since an operation of determining whether the compressor 205 is normal is the same as in S103 of FIG. 9, a detailed description thereof has been omitted.

The thermal management control apparatus 100 may perform a control strategy for battery overheating protection when the compressor 205 is in a fault state (S204). In other words, the thermal management control apparatus 100 may open the valve 313 to enable the stack coolant to flow into the heat exchanger 210 to lower the battery coolant temperature. In addition, the thermal management control apparatus 100 may output a fuel cell output as an allowable battery output for battery overheating protection. In this case, the allowable battery output is between the battery discharge limit and the battery charge limit of FIG. 5. The allowable battery output refers to a voltage within a section in which a battery discharge output voltage and a battery charge output voltage fall in 501 and 502 of FIG. 5. For example, when the battery temperature is less than the second reference temperature, 100% of the fuel cell output may be outputted. However, when the battery temperature is higher than the second reference temperature (e.g. a to b ° C.), only 80% of the fuel cell output may be outputted, and when the battery temperature is higher than the third reference temperature (e.g., c ° C.), only 5% of the fuel cell output may be outputted. As such, it is possible to lower the stack coolant temperature by reducing the fuel cell output.

In addition, the thermal management control apparatus 100 performs stack battery cooperative cooling control to protect the battery from overheating. In other words, the thermal management control apparatus 100 may rotate the cooling fan 302 of the stack cooling circuit 300 at E rpm to help air-cooling of the radiator 301 and may rotate the water pumps 305 and 306 at F rpm to increase a water pumping force so that the coolant in the stack cooling circuit 300 flows well. As such, when a failure of the compressor 205 occurs to increase the temperature of the battery 201 above the second reference temperature (e.g., b ° C.) the thermal management control apparatus 100 may reduce the fuel cell output within the allowable battery output from the normal output to output the allowable battery output. The control apparatus 100 may also lower the stack coolant temperature by increasing the rotational forces of the water pumps 305 and 306. In this case, E and F may be determined in advance as optimal values by experiment values and may be larger than the above-described A, B, C, and D.

When the compressor 205 is in a normal state, not in a failure state, the thermal management control apparatus 100 determines whether the valve 313 has failed or is normal (S205). In this case, since a method of determining whether the valve 313 has failed or is normal is the same as that of S105 of FIG. 9 described above, a detailed description thereof has been omitted.

When it is determined that the failure of the valve 313 occurs, the thermal management control apparatus 100 performs a control strategy for overheating protection (S206). In addition, the thermal management control apparatus 100 may output a fuel cell output as an allowable battery output for battery overheating protection. In addition, the thermal management control apparatus 100 performs cooperative cooling control between the stack cooling circuit 300 and the battery cooling circuit 200.

In other words, the thermal management control apparatus 100 may rotate the cooling fan 302 of the stack cooling circuit 300 at G rpm to help air-cooling of the radiator 301. In addition, the thermal management control apparatus 100 may rotate the water pumps 305 and 306 at H rpm to increase a water pumping force so that the coolant in the stack cooling circuit 300 flows well. As such, when a failure of the valve 313 occurs, when the temperature of the battery 201 rises above b ° C., the thermal management control apparatus 100 may lower the battery coolant temperature by increasing a rotational force of the cooling fan 302 and by increasing rotational forces of the water pumps 305 and 306 while normally outputting the fuel cell output, thereby lowering the stack coolant temperature. In this case, G and H may be determined in advance as optimal values by experimental values, and may be the same as or different from E and F.

In addition, the thermal management control apparatus 100 may use the compressor 205 to cool the battery 201.

When it is determined that the valve 313 is no al in step S205, the thermal management control apparatus 100 may determine whether a refrigerant pressure of the chiller 202 is normal (S207). In this case, since the determining of whether the refrigerant pressure is normal is the same as that of S107 of FIG. 9 described above, a detailed description thereof has been omitted.

When the refrigerant pressure is in an overpressure or low pressure state, the thermal management control apparatus 100 may perform a control strategy for overheating protection, as in step S204.

When the refrigerant pressure is normal, i.e., when the refrigerant pressure of the compressor 205, the valve 313, and the chiller 202 are all normal, the thermal management control apparatus 100 returns to step S201 to check the temperature of the battery 201 again.

Referring to FIG. 11, the thermal management control apparatus 100 determines whether the battery temperature is equal to or higher than the third reference temperature (e.g., c ° C.) (S301).

When the battery temperature is less than the third reference temperature (e.g., c ° C.), corresponding to Section 1 to Section 3, the thermal management control apparatus 100 performs the above-described process of FIG. 9 (S302).

When the battery temperature is equal to or higher than the third reference temperature (e.g., c ° C.), the thermal management control apparatus 100 determines whether the compressor 205 is normal (S303). In this case, since an operation of determining whether the compressor 205 is normal is the same as in S103 of FIG. 9, a detailed description thereof has been omitted.

The thermal management control apparatus 100 may perform a control strategy for battery overheating protection when the compressor 205 is in a fault state (S304). In other words, the thermal management control apparatus 100 may open the valve 313 to enable the stack coolant to flow into the heat exchanger 210 to lower the battery coolant temperature. In addition, the thermal management control apparatus 100 may output a fuel cell output as 0 for battery overheating protection. In this case, although the magnitude of the fuel cell output is exemplified as 0, the present disclosure is not limited thereto, and may be an optimal fuel cell output capable of lowering the stack coolant temperature. As such, it is possible to lower the stack coolant temperature by reducing the fuel cell output. In addition, the thermal management control apparatus 100 performs stack battery cooperative cooling control to protect the battery from overheating. In other words, the thermal management control apparatus 100 may rotate the cooling fan 302 of the stack cooling circuit 300 at I rpm to help air-cooling of the radiator 301 and may rotate the water pumps 305 and 306 at J rpm to increase a water pumping force so that the coolant in the stack cooling circuit 300 flows well. As such, when a failure of the compressor 205 occurs to increase the temperature of the battery 201 above the third reference temperature (e.g., c ° C.), the thermal management control apparatus 100 may reduce the fuel cell output within the allowable battery output from the normal output to output the allowable battery output. The thermal management control apparatus 100 may also lower the stack coolant temperature by increasing the rotational forces of the water pumps 305 and 306. In this case, I and J may be determined in advance as optimal values by experimental values, and may be larger than the aforementioned values of A, B, C, D, E, F, G, and H.

When the compressor 205 is in a normal state, i.e., not in a failure state, the thermal management control apparatus 100 determines whether the valve 313 has failed or is normal (S305). In this case, since a method of determining whether the valve 313 has failed or is normal is the same as that of S105 of FIG. 9 described above, a detailed description thereof has been omitted.

When it is determined that the failure of the valve 313 occurs, the thermal management control apparatus 100 performs a control strategy for overheating protection (S306). In addition, the thermal management control apparatus 100 may output a fuel cell output as 0 for battery overheating protection. In this case, although the magnitude of the fuel cell output is exemplified as 0, the present disclosure is not limited thereto, and may be an optimal fuel cell output capable of lowering the stack coolant temperature. In addition, the thermal management control apparatus 100 performs cooperative cooling control between the stack cooling circuit 300 and the battery cooling circuit 200.

In other words, the thermal management control apparatus 100 may rotate the cooling fan 302 of the stack cooling circuit 300 at k rpm to help air-cooling of the radiator 301. Further, the thermal management control apparatus 100 may rotate the water pumps 305 and 306 at L rpm to increase a water pumping force so that the coolant in the stack cooling circuit 300 flows well. As such, when a failure of the valve 313 occurs, when the temperature of the battery 201 rises above c ° C., the thermal management control apparatus 100 may lower the battery coolant temperature by increasing a rotational force of the cooling fan 302 and increasing rotational forces of the water pumps 305 and 306 while normally outputting the fuel cell output, thereby lowering the stack coolant temperature. In this case, K and L may be determined in advance as optimal values by experimental values, and may be the same as or different from I and J.

In addition, the thermal management control apparatus 100 may use the compressor 205 to cool the battery 201.

When it is determined that the valve 313 is normal in step S305, the thermal management control apparatus 100 may determine whether a refrigerant pressure of the chiller 202 is normal (S307). In this case, since the determining of whether the refrigerant pressure is normal is the same as that of S107 of FIG. 9 described above, a detailed description thereof has been omitted.

When the refrigerant pressure is in an overpressure or low pressure state, the thermal management control apparatus 100 may perform a control strategy for overheating protection as in step S304.

When the refrigerant pressure is normal, i.e., when the refrigerant pressure of the compressor 205, the valve 313, and the chiller 202 are all normal, the thermal management control apparatus 100 returns to step S301 to check the temperature of the batter 201 again.

Figure 12:
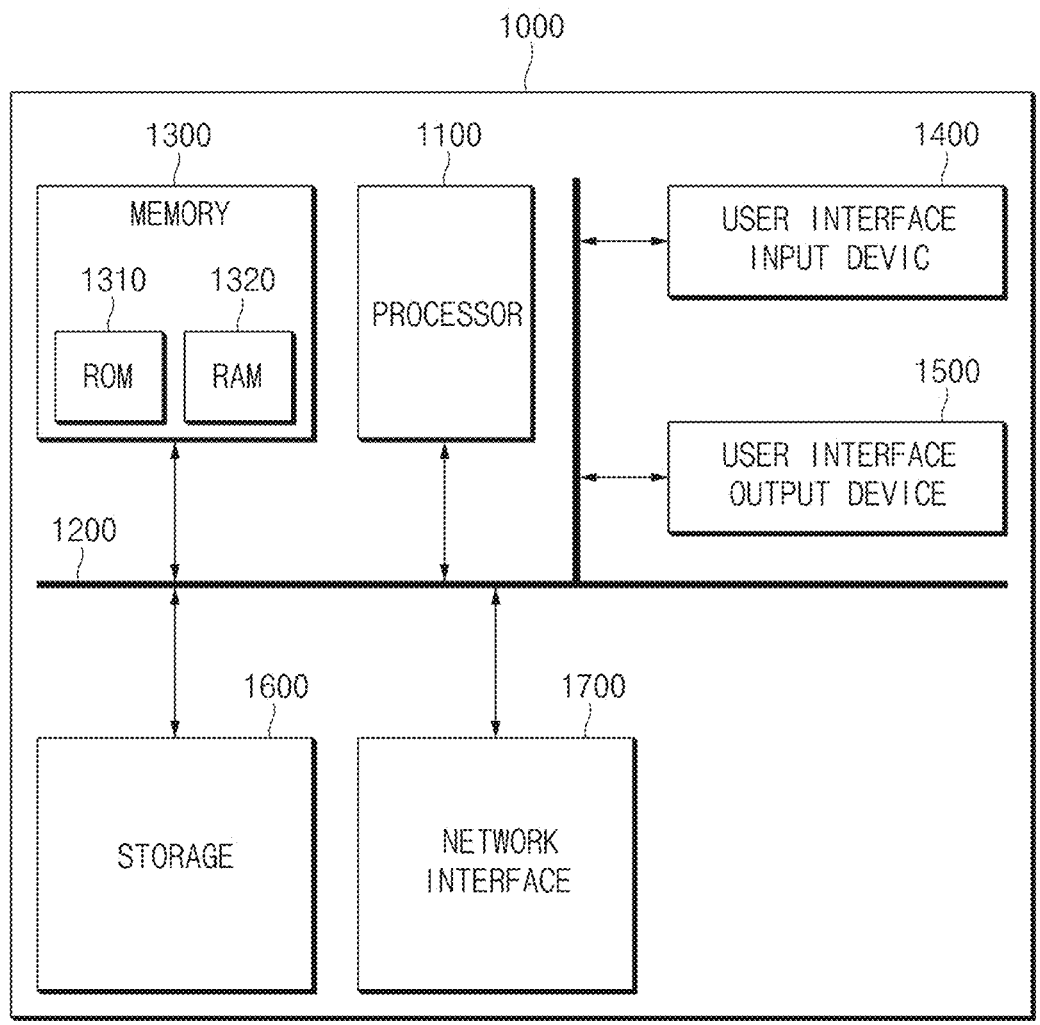
FIG. 12 illustrates a computing system according to an embodiment of the present disclosure.

FIG. 12 illustrates a computing system according to an embodiment of the present disclosure.

Referring to FIG. 12, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

A storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure. Those having ordinary skill in the art to which the present disclosure pertains may make various modifications and variations without departing from the essential characteristics of the present disclosure, Therefore, the embodiments disclosed in the present disclosure are not intended to limit the technical ideas of the present disclosure, but to explain them, and the scope of the technical ideas of the present disclosure is not limited by these embodiments. The protection range of the present disclosure should be interpreted by the claims below, and all technical ideas within the equivalent range should be interpreted as being included in the scope of the present disclosure.

What is claimed is:

1. A thermal management system for a fuel cell electric vehicle, comprising:
 a stack cooling line configured to cool a fuel cell stack of the fuel cell electric vehicle;
 a battery cooling line configured to cool a battery of the fuel cell electric vehicle;
 a heat exchanger configured to exchange heat between a stack coolant of the stack cooling line and a battery coolant of the battery cooling line;
 a valve configured to control an inflow of the stack coolant to the heat exchanger; and
 a control apparatus configured to diagnose whether a component of the valve or the battery cooling line has failed when the battery has overheated, and to control a fuel cell output to cool the stack coolant and cool the battery by using a temperature of the stack coolant when a failure of the valve or a component failure of the battery cooling line occurs.

2. The thermal management system of claim 1, wherein the control apparatus is configured to determine whether the component of the battery cooling line has failed by determining whether a temperature of the battery cooling line is normal by driving the component of the battery cooling line after the valve is closed.

3. The thermal management system of claim 1, wherein the control apparatus is configured to drive the component of the battery cooling line in a closed state of the valve, and then to determine that the component of the battery cooling line is in a normal state when a battery coolant temperature is lower than a battery inlet coolant temperature and the battery inlet coolant temperature is lower than a battery temperature.

4. The thermal management system of claim 1, wherein the control apparatus is configured to stop an operation of the component of the battery cooling line for a predetermined time in an open state of the valve, and then to determine whether the valve has failed by determining whether a temperature of the battery cooling line is in a normal state.

5. The thermal management system of claim 1, wherein the control apparatus is configured to stop an operation of the component of the battery cooling line for a predetermined time in an open state of the valve, and then to determine that the valve is in a normal state when a battery inlet coolant temperature is lower than a battery temperature.

6. The thermal management system of claim 1, wherein, when all components of the valve and the battery cooling line are in a normal state, the control apparatus is configured to determine an overpressure state or a low pressure state of a refrigerant pressure of the battery cooling line.

7. The thermal management system of claim 6, wherein, when a temperature of the battery is greater than or equal to a first reference value and is less than a second reference value that is greater than the first reference value, and when the component of the battery cooling line or the refrigerant pressure of the battery cooling line is in an overpressure or low pressure state, the control apparatus is configured to open the valve to enable the stack coolant to flow into the heat exchanger, is configured to output the fuel cell output in a normal operating range, and is configured to control rotation speeds of a cooling fan and a water pump of the stack cooling line.

8. The thermal management system of claim 7, wherein, when the temperature of the battery is greater than or equal to the second reference value and is less than a third reference value that is greater than the second reference value, and when the component of the battery cooling line or the refrigerant pressure of the battery cooling line is in an overpressure or low pressure state, the control apparatus is configured to open the valve to enable the stack coolant to flow into the heat exchanger, is configured to reduce the fuel cell output to within an allowable battery output to output the allowable battery output, and is configured to control rotation speeds of a cooling fan and a water pump of the stack cooling line.

9. The thermal management system of claim 8, wherein, when the temperature of the battery is greater than or equal to a third reference value, and when the component of the battery cooling line or the refrigerant pressure of the battery cooling line is in an overpressure or low pressure state, the control apparatus is configured to open the valve to enable the stack coolant to flow into the heat exchanger, is configured to reduce the fuel cell output to a predetermined minimum value to output the predetermined minimum value, and is configured to control rotation speeds of a cooling fan and a water pump of the stack cooling line.

10. The thermal management system of claim 6, wherein, when the temperature of the battery is greater than or equal to a second reference value and is less than a third reference value greater than the second reference value, and when the valve has failed, the control apparatus is configured to maintain an open state of the valve to enable the stack coolant to flow into the heat exchanger, is configured to output the fuel cell output in a normal operating range, is configured to control rotation speeds of a cooling fan and a water pump of the stack cooling line, and is configured to cool the battery by using a refrigerant of the battery cooling line.

11. The thermal management system of claim 10, wherein, when the temperature of the battery is greater than or equal to the second reference value and is less than a third reference value that is greater than the second reference value, and when the valve has failed, the control apparatus is configured to maintain the open state of the valve to enable the stack coolant to flow into the heat exchanger, is configured to reduce the fuel cell output to within an allowable battery output to output the allowable battery output, is configured to control rotation speeds of a cooling fan and a water pump of the stack cooling line, and is configured to cool the battery by using a refrigerant of the battery cooling line.

12. The thermal management system of claim 11, wherein, when the temperature of the battery is greater than or equal to a third reference value, and when the valve has failed, the control apparatus is configured to maintain the open state of the valve to enable the stack coolant to flow into the heat exchanger, is configured to reduce the fuel cell output to a predetermined minimum value to output the predetermined minimum value, is configured to control rotation speeds of a cooling fan and a water pump of the stack cooling line, and is configured to cool the battery by using a refrigerant of the battery cooling line.

13. The thermal management system of claim 1, wherein the component of the battery cooling line includes at least one of a compressor, a cooling fan, a condenser, an expander, or any combination thereof.

14. The thermal management system of claim 1, wherein, when a failure of the valve or a component failure of the battery cooling line occurs, without limiting a battery charging current or discharging current, the control apparatus is configured to increase cooling performance of the stack cooling line by controlling an output of a fuel cell and driving of a cooling fan and a water pump of the stack cooling line for each battery temperature section.

15. A control method of a thermal management system for a fuel cell electric vehicle, the method comprising:
    diagnosing, by a control apparatus, whether a component of a battery cooling line or a valve that controls an inflow of a stack coolant to a battery heat exchanger has failed when a temperature of a battery has overheated;
    cooling, by the control apparatus, the stack coolant by controlling a fuel cell output when a failure of the valve or a component failure of the battery cooling line occurs; and
    cooling, by the control apparatus, the battery by using a temperature of the stack coolant.

16. The control method of claim 15, wherein, when a failure of the valve or a component failure of the battery cooling line occurs, without limiting a battery charging current or discharging current, the cooling of the battery by using the temperature of the stack coolant includes increasing cooling performance of the stack cooling line by controlling an output of a fuel cell and driving of a cooling fan and a water pump of the stack cooling line for each temperature section of the battery.

17. The control method of claim 15, wherein the diagnosing of whether the component of the battery cooling line or the valve has failed includes driving, by the control apparatus, the component of the battery cooling line in a closed state of the valve, and then determining, by the control apparatus, that the component of the battery cooling line is in a normal state when a battery coolant temperature is lower than a battery inlet coolant temperature and the battery inlet coolant temperature is lower than a battery temperature.

18. The control method of claim 15, wherein the diagnosing of whether the component of the battery cooling line or the valve is failed includes stopping, by the control apparatus, an operation of the component of the battery cooling line for a predetermined time in an open state of the valve, and then determining, by the control apparatus, whether the valve has failed by determining whether the temperature of the battery cooling line is in a normal state.

19. The control method of claim 15, further comprising, when all components of the valve and the battery cooling line are in a normal state, determining an overpressure state or a low pressure state of a refrigerant pressure of the battery cooling line.

20. The control method of claim 19, wherein, when the temperature of the battery is greater than or equal to a first reference value and is less than a second reference value that is greater than the first reference value, and when the component of the battery cooling line or the refrigerant pressure of the battery cooling line is in an overpressure or low pressure state, the control method further comprises:
    opening, by the control apparatus, the valve to enable the stack coolant to flow into the heat exchanger;
    outputting, by the control apparatus, the fuel cell output in a normal operating range; and
    controlling, by the control apparatus, rotation speeds of a cooling fan and a water pump of the stack cooling line.

\* \* \* \* \*